US012119569B1

(12) United States Patent
Jones, III

(10) Patent No.: US 12,119,569 B1
(45) Date of Patent: Oct. 15, 2024

(54) FAN NEAR VERTICAL INCIDENCE SKYWAVE ANTENNA WITH FEED POINT NEAR GROUND

(71) Applicant: The United States of America, as Represented by the Secretary of the Navy, San Diego, CA (US)

(72) Inventor: Thomas Owings Jones, III, San Diego, CA (US)

(73) Assignee: United States of America as represented by the Secretary of the Navy, Washington, DC (US)

( * ) Notice: Subject to any disclaimer, the term of this patent is extended or adjusted under 35 U.S.C. 154(b) by 0 days.

(21) Appl. No.: 18/733,081

(22) Filed: Jun. 4, 2024

(51) Int. Cl.
*H01Q 9/16* (2006.01)
*H01Q 21/06* (2006.01)

(52) U.S. Cl.
CPC ............... *H01Q 9/16* (2013.01); *H01Q 21/06* (2013.01); *H01Q 21/062* (2013.01)

(58) Field of Classification Search
CPC ......... H01Q 9/16; H01Q 21/062; H01Q 21/06
See application file for complete search history.

(56) References Cited

U.S. PATENT DOCUMENTS 3,569,970 A * 3/1971 Fenwick .............. H01Q 1/1235 343/797
4,733,243 A * 3/1988 Feigenbaum .......... H01Q 11/10 343/860
8,774,866 B1 * 7/2014 Anderson ................ H01Q 1/14 343/702
2007/0093269 A1 * 4/2007 Leabman ............. H04B 7/0874 455/562.1
2011/0275376 A1 * 11/2011 Boldi ................... H04B 7/0617 455/436
2013/0116011 A1 * 5/2013 Lee ........................ H01Q 1/246 455/562.1
2016/0064831 A1 * 3/2016 Jones, III ............ H01Q 21/062 343/812
2019/0386372 A1 * 12/2019 Lill .......................... H01Q 9/32

OTHER PUBLICATIONS

Technical Manual, "Operator's .. and . . . Maintenance Manual", Antenna AS-2259/GR, HQ Department of the Army, TM 11-5985-379-14&P, Feb. 14, 1986.
"Lightweight Manportable HF Broadband Antennas, FANLITE™" Brochure and Specification, C&S Antennas, an Amphenol Company.
Near vertical incidence skywave, Wikipedia.
Witvliet et al., "Near Vertical Incidence Skywave Propagation Elevation Angles and Optimum Antenna . . .", IEEE Antennas and Propagation Magazine, vol. 57, No. 1, Feb. 2015.

* cited by examiner

*Primary Examiner* — Hai V Tran
(74) *Attorney, Agent, or Firm* — Naval Information Warfare Center, Pacific; Kyle Eppele; Paul C. Oestreich

(57) ABSTRACT

The present invention includes fan near vertical incident skywave (NVIS) antennas, communication systems and method of use. Fan NVIS antennas may be configured in either base station or remote station for use with transceivers. Fan NVIS base station antennas may be in configurations of either 3 or 4 dipoles and include waist wires connecting adjacent vertices and skirt wires connecting dipole end points. Fan NVIS remote station antennas may be in a 2-dipole configuration and also include skirt wires connecting adjacent dipole end points.

21 Claims, 9 Drawing Sheets

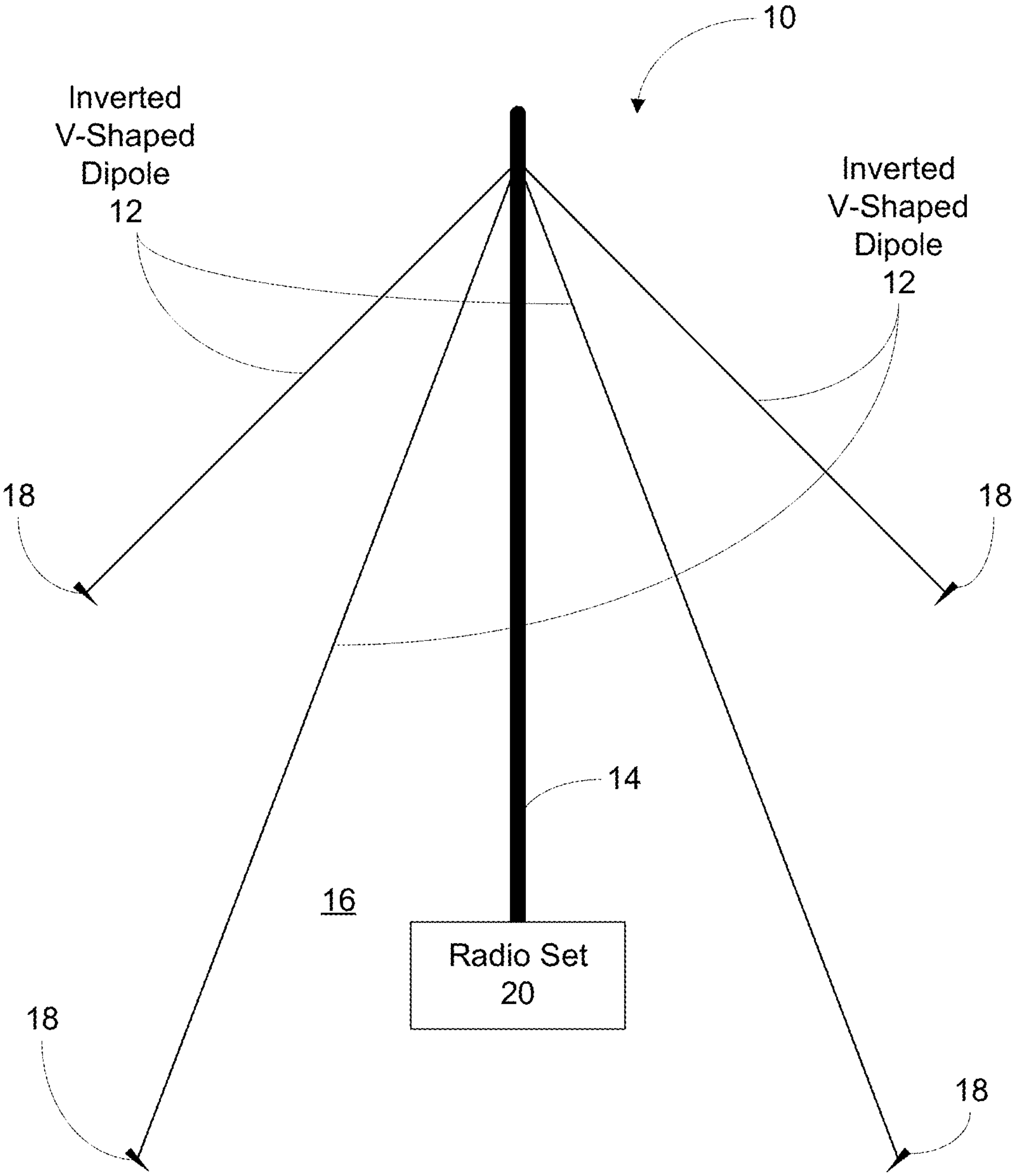
*FIG. 1 – Prior Art*

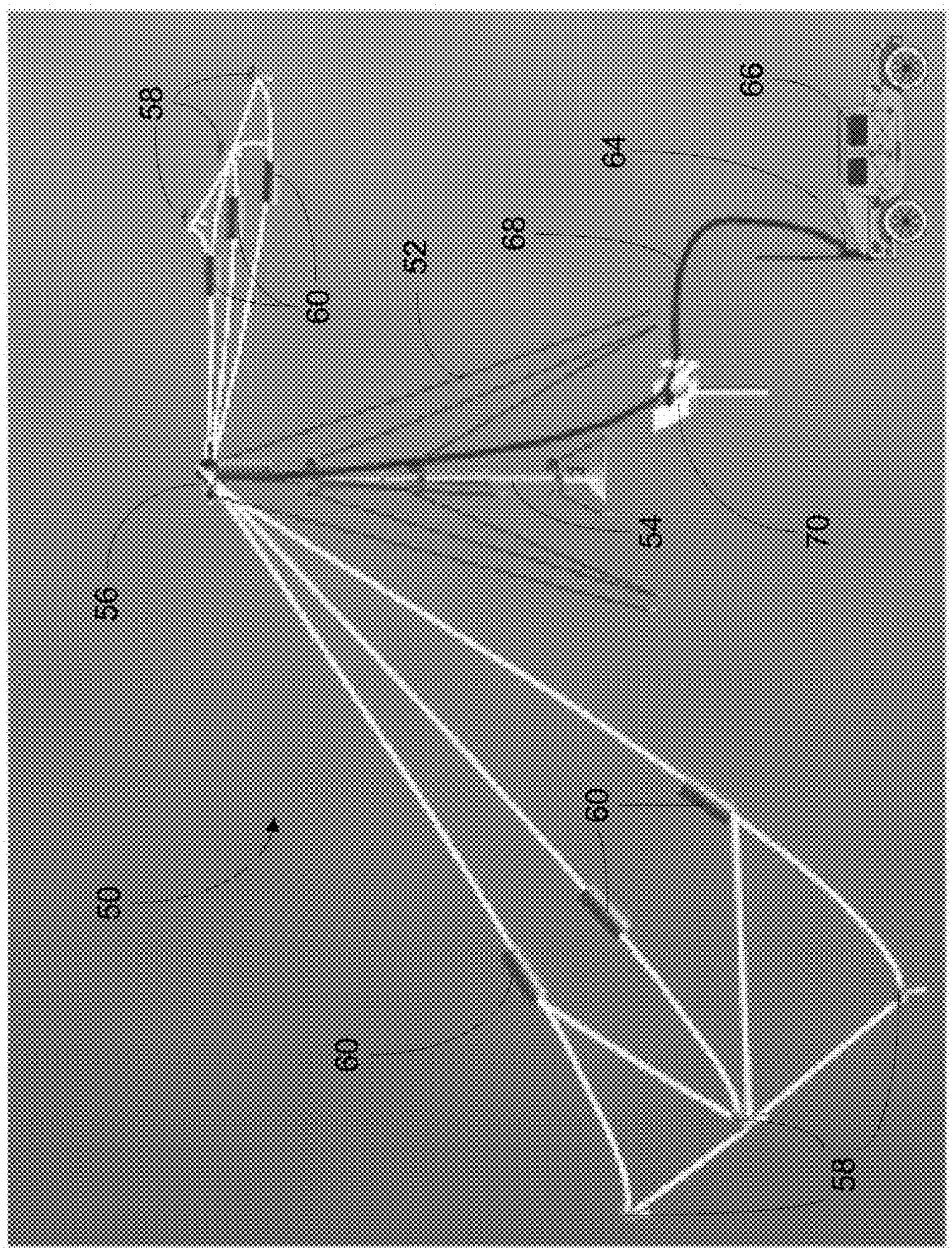
*FIG. 3 – Prior Art*

FAN NEAR VERTICAL INCIDENCE SKYWAVE ANTENNA WITH FEED POINT NEAR GROUND

FEDERALLY SPONSORED RESEARCH AND DEVELOPMENT

The United States Government has ownership rights in this invention. Licensing and technical inquiries may be directed to the Office of Research and Technical Applications, Naval Information Warfare Center Pacific, Code 72120, San Diego, CA, 92152; voice: (619) 553-5118; email: NIWC_Pacific_T2@navy.mil. Reference Navy Case Number 103913.

BACKGROUND OF THE INVENTION

Field of the Invention: The present invention relates generally to antenna used for communications. More particularly, the present invention relates to near vertical incidence skywave (NVIS) antennas. Still more particularly, the present invention relates to fan NVIS antennas in base station and remote station configurations each having feed point near ground.

Description of Related Art: Near vertical incidence skywave, or NVIS, is a skywave radio-wave propagation path that typically provides usable signals in the medium distances range, usually 0-650 km (0-400 miles). NVIS is used for military and paramilitary communications, broadcasting, especially in the tropics, and by radio amateurs for nearby contacts circumventing line-of-sight barriers. The radio waves from a NVIS antenna travel near-vertically upwards into the ionosphere, where they are reflected back down and can be received within a circular region up to 650 km (400 miles) from the transmitter. The steep up and down propagation of the signal gives the NVIS antenna communications operator the ability to communicate over nearby ridge lines, mountains, and dense vegetation.

FIG. 2A is a diagram illustrating the relative height of the ionospheric layers in Earth atmosphere for night and day. The usable frequencies change from day to night because sunlight causes the lowest layer of the ionosphere, called the D layer, to increase, causing attenuation of low frequencies during the day while the maximum usable frequency (MUF) which is the critical frequency of the F layer rises with greater sunlight. Real-time maps of the critical frequency are available. Use of a frequency about 15% below the critical frequency generally provides reliable NVIS service. This is sometimes referred to as the optimum working frequency, or frequency of optimal transmission (FOT).

FIG. 2B is a diagram illustrating exemplary NVIS communications using the ionosphere to communicate without line-of-sight (LOS). As shown in FIG. 2B, a base station 30 (labeled as BS) may be located in a valley 32 or ravine separated by hills 34 where remote stations 40 (two shown and labeled RS1 and RS2) that may also be located in valleys 32 or ravines such that direct LOS communications are precluded. The double-ended arrows represent RF signals 42 being sent to and from a base station 30 to a remote station 40 by bouncing the RF signals 42 off of the ionosphere 25.

NVIS communication is most useful in mountainous areas where LOS propagation is ineffective, or when the communication distance is beyond the 80 km (50 miles) range of groundwave (or the terrain is so rugged and barren that groundwave is not effective), and less than the 500-2,400 km (300-1,500 miles) range of lower-angle sky-wave propagation. Another interesting aspect of NVIS communication is that direction finding of the sender is more difficult than for ground-wave communication (i.e., VHF or UHF). For broadcasters, NVIS allows coverage of an entire medium-sized country at much lower cost than with VHF (FM), and daytime coverage, similar to mediumwave (AM broadcast) nighttime coverage at lower cost and often with less interference.

Typically, the most reliable frequencies for NVIS communications are between 1.8 MHz and 8 MHz. If the frequency is too high (that is, above the critical frequency of the ionospheric F layer), reflection is insufficient to return the signal to earth and if it is too low, absorption in the ionospheric D layer may reduce the signal strength. Above 8 MHz, the probability of success begins to decrease, dropping to near zero at 30 MHz. Usable frequencies are dictated by local ionospheric conditions, which have a strong systematic dependence on geographical location. Common bands used in amateur radio at mid-latitudes are 3.5 MHz at night and 7 MHz during daylight, with experimental use of 5 MHZ (60 m) frequencies. During winter nights at the bottom of the sunspot cycle, the 1.8 MHz band may be required. Broadcasting uses the tropical broadcast bands between 2.3 and 5.06 MHz, and the international broadcast bands between 3.9 and 6.2 MHz. Military NVIS communications mostly take place within 2-4 MHz at night, and 5-7 MHz during daylight. Optimum NVIS frequencies tend to be higher towards the tropics and lower towards the arctic regions. Optimum NVIS frequencies are also higher during high sunspot activity years.

A conventional NVIS antenna configuration may be a horizontally polarized (parallel with the surface of the earth) radiating element that is from 1/20 wavelength (λ) to 1/4 wave above the ground. The optimum height of such an antenna is about 1/4 wavelength, and high angle radiation declines only slightly for heights up to about 3/8 wave. That proximity to the ground forces the majority of the radiation to go straight up, causing NVIS propagation to occur.

FIG. 1 is a diagram of a conventional military NVIS antenna 10, namely the AS-2259 antenna 10. The AS-2259 antenna 10 employs a set of two crossed sloping dipoles 12 positioned at right angles to each other supported by a central antenna mast 14 and anchored to ground 16 with stakes 18. The AS-2259 antenna 10 dipoles 12 are inverted V-shaped dipoles 12. The four dipole wires also serve as guy wires for stabilizing the antenna mast 14. The AS-2259 antenna 10 may be used with a radio set 20, or any suitable high frequency (HF) radio, e.g., the conventional AN/PRC-47 radio.

While the inverted V configurations of NVIS antennas 10 have high angle radiation, such configurations can also have strong ground wave radiation which causes destructive signal interference that could interfere with close-in NVIS communications.

FIG. 3 is a diagram of conventional fan NVIS antenna 50 available from C&S Antennas, 1123 Industrial Dr SW, Conover, NC 28613, associated with the brand name, FANLITE™. The FANLITE™ antenna 50 is a HF broadband antenna in a fan configuration. The primary configuration of the FANLITE™ antenna 50 is a fan dipole. Viewed from above, the wire elements of the FANLITE™ antenna 50 resemble a bow tie. In this configuration, the center of the antenna beam over the lower portion of the HF band is directed straight upwards for NVIS operation. The radiation pattern is omnidirectional ±1 dB over the frequency range 2 to 8 MHz at angles at or above 60° above the horizon. At higher frequencies, the antenna beam becomes approximately hemispherical, providing useful single-hop performances to about 2,000 miles. The FANLITE™ antenna 50 radiates at a 30° take off angle (TOA) to provide NVIS HF coverage from 0-2,000 miles without any skip zones, even in mountainous terrain. As shown in FIG. 3, the FANLITE™ antenna 50 may include a sectioned mast 54 with balun 56 at top supported by guy wires 52. The bow tie like wire elements of the FANLITE™ antenna 50 also include resistors 60 (six shown) and be held down onto ground 62 at opposite ends by stakes 58 (also six shown). The FANLITE™ antenna 50 is tuned by a conventional radio set transceiver 64, shown in FIG. 3 attached to a ground vehicle 66. As further shown in FIG. 3, the FANLITE™ antenna 50 may be connected to the radio set transceiver 64 via a transmission cable 68 connected near the balun 56. An intermediate base station 70 for the user to control communications to and from the base station is shown connected to the transmission cable 68.

The FANLITE™ antenna 50 uses six resistors 60 in the antenna fan to achieve a 2.2 to 1 voltage standing wave ratio (VSWR). In order to overcome antenna loss, an additional 100 W power amplifier (not shown in FIG. 3) is used along with a standard (10 W) radio set transceiver 64 at the input of the FANLITE™ antenna 50. The 100 W power amplifier plays no role with the reception at the base station 70. The 100 W power amplifier only improves the performance of the transmissions from the base station 70 to remote stations (not shown). Transmissions from a remote antenna station (e.g., with power of 10 W) back to the base station 70 are limited by the base station 70 antenna efficiency. It will be understood that the RF signal level received by the remote antenna with be 10 dB higher than the RF signal level received by the base station 70. The transceiver 64 for both antennas (base 70 and remote) are typically the same and both have a power of 10 W. Accordingly, the signal transmitted by the remote station is closer to the noise floor than the signal transmitted by the base station 70. Thus, it may be the case that communication between the remote station and the base station 70 may not be possible.

Another draw-back of conventional fan NVIS antenna 50 is the transmission cable 68 being connected to the antenna 50 at the balun 56 level prior to erection via the mast 54. The mast 54 generally requires lowering to access that connection point. Additionally, it would be preferable to have a fan NVIS antenna design that did not require resistors 60.

In view of the foregoing and for other reasons that will become more apparent, there exists a need in the art for improved NVIS antenna configurations and communications techniques.

SUMMARY OF THE INVENTION

An embodiment of a fan NVIS antenna is disclosed. The embodiment of a fan NVIS antenna may include a mast extending along a Z-axis and having height, $h_4$, measured from ground; a plurality of dipoles crossing each other at a central feed point disposed at the mast, adjacent dipoles separated from each other by an angle, θ, when viewed along the Z-axis, the plurality of dipoles having a bowtie shape when viewed along the Z-axis, wherein each wing of the bowtie is symmetrical about the Z-axis; wherein the feed point is located at a height, $h_3$, measured from ground; wherein each of the plurality of dipoles further includes end points located at a height, $h_2$, measured from ground; wherein each of the plurality of dipoles further includes two vertices, each of the two vertices located at a height, $h_1$, measured from ground, each of the vertices disposed at a location between one of the end points and the feed point; and wherein $h_4>h_1>h_2>h_3$.

An embodiment of a NVIS radio communication system is disclosed. The embodiment of a NVIS radio communication system may include a fan NVIS base station antenna in communication with a base radio set; a fan NVIS remote station antenna in communication with a remote radio set. According to this system embodiment, the base station antenna and the remote station antenna may each include: a mast extending along a Z-axis and having height, $h_4$, measured from ground; a plurality of dipoles crossing each other at a central feed point disposed at the mast, adjacent dipoles separated from each other by an angle, θ, when viewed along the Z-axis, the plurality of dipoles having a bowtie shape when viewed along the Z-axis, wherein each wing of the bowtie is symmetrical about the Z-axis; wherein the feed point is located at a height, $h_3$, measured from ground; wherein each of the plurality of dipoles further includes end points located at a height, $h_2$, measured from ground; wherein each of the plurality of dipoles further includes two vertices, each of the two vertices located at a height, $h_1$, measured from ground, each of the vertices disposed at a location between one of the end points and the feed point; and wherein $h_4>h_1>h_2>h_3$.

An embodiment of a method of communicating using NVIS radio communications is disclosed. The embodiment of a method of communicating may include providing a base station with a fan NVIS base antenna in communication with a base radio set located in a base location and a remote station with a fan NVIS remote antenna in communication with a remote radio set located in a remote location, and a base station user communicating with a remote station user.

BRIEF DESCRIPTION OF THE DRAWINGS

The following drawings illustrate exemplary embodiments for carrying out the invention. Like reference numerals refer to like parts in different views or embodiments of the present invention in the drawings.

FIG. 1 is a diagram of a conventional military NVIS antenna.

FIG. 3 is a diagram of conventional fan NVIS antenna.

DETAILED DESCRIPTION

The disclosed methods and systems below may be described generally, as well as in terms of specific examples and/or specific embodiments. For instances where references are made to detailed examples and/or embodiments, it should be appreciated that any of the underlying principles described are not to be limited to a single embodiment but may be expanded for use with any of the other methods and systems described herein as will be understood by one of ordinary skill in the art unless specifically otherwise stated.

The present invention is directed toward solving the technical problem of improving man-portable antenna efficiency in both the base and remote station fan NVIS antenna communication systems. To solve that technical problem, embodiments of a fan configuration NVIS antenna with a feed point near ground with additional novel and nonobvious features are disclosed. Accordingly, a particularly useful feature of the fan NVIS antennas of the present invention is the elimination of the resistors 60 required by the conventional fan NVIS antenna 60. The inventor has unexpectedly discovered that tuning of the novel fan NVIS antennas of the present invention performs best when the feed point is near ground. The near ground antenna feed point feature of the present invention also provides ease of access to the feed point when fully set up for use. Finally, embodiments of the fan NVIS antenna design of the present invention eliminate the need for a 100 W power amplifier at the base station. Thus, the RF signal received at the feed point of a base station and/or a remote antenna will be the same.

Exemplary embodiments of the fan NVIS antenna of the present invention may also reduce the antenna pattern gain at low elevation angles, which is measured in degrees relative to ground level. By reducing the antenna pattern gain at low elevation angles there is also an advantageous reduction in the atmospheric noise received at the feed point.

The tuned antenna bandwidth depends on the Q-factor, where $Q<200$ for a 10 KHz bandwidth operating at 2 MHZ. The Q-factor is the ratio of power stored in the reactive field and the radiated power. The Q-factor determines the rate that the antenna's transmitted frequency can be changed by the RF input at the antenna feed point. The antenna's transmitted frequency lags the input frequency at the feed point. The efficiency of the transmitter tuner depends on the antenna Q-factor. A large, stored energy in the antenna flow between the antenna and the tuner. The Q-factor is the decay rate of the stored energy. The faster the stored energy in the antenna decays translates into lower resistive loss in the tuner and antenna wires. A low Q-factor is very desirable over the entire frequency range.

Figure 7A:
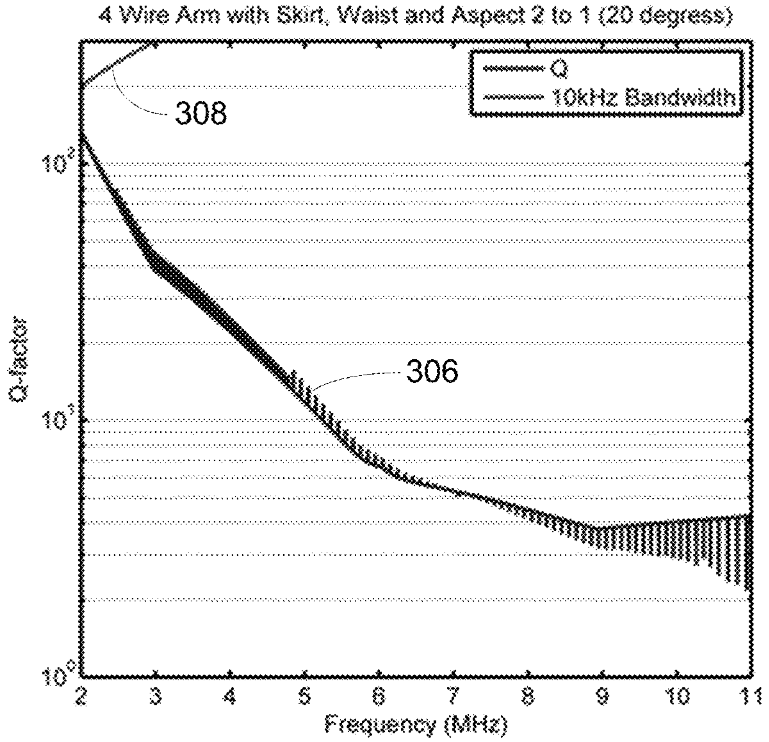
FIGS. 7A and 7B are graphs illustrating Q-factor as a function of frequency, for a 4-wire embodiment and a 3-wire embodiment, respectively, of the skirt and waist fan NVIS base station antennas, according to the present invention.
Figure 7B:
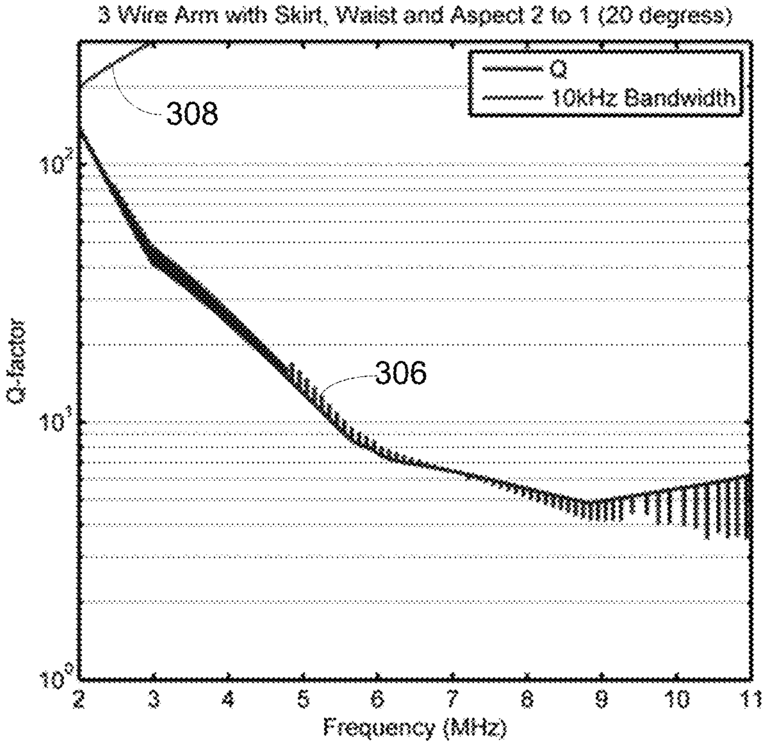

FIGS. 7A and 7B are graphs illustrating Q-factor as a function of frequency, for the 4-wire embodiment 100 and 3-wire embodiment 200, respectively, of the with skirt and waist fan NVIS base station antennas disclosed herein, according to the present invention. In both original color graphs, Q-factor 306 is shown in blue and the 10 kHz bandwidth 308 is shown in green.

As noted above, the conventional fan NVIS antenna 60 is not power efficient. This is because its 2:2 to 1 VSWR (Voltage Standing Wave Ratio) is achieved with resistors in the wire elements. In the base station antenna of a communication system using the conventional fan NVIS antenna 60, the input power is increased to 100 W with a power amplifier to compensate for the power loss inefficiency. The amplifier improves the receiver signal strength for the remote antenna of a communication system. However, the remote transmitter using the conventional fan NVIS antenna 60 typically does not have a power amplifier. Thus, the receive signal strength at the base station is reduced by the inefficient base station antenna. It will be understood that the base station amplifier does not improve the receive signal at the base station. The present invention improves the efficiency of the base station and improves performance for the remote transmitter.

4-Wire NVIS Base Station Antenna Design

Figure 2A:
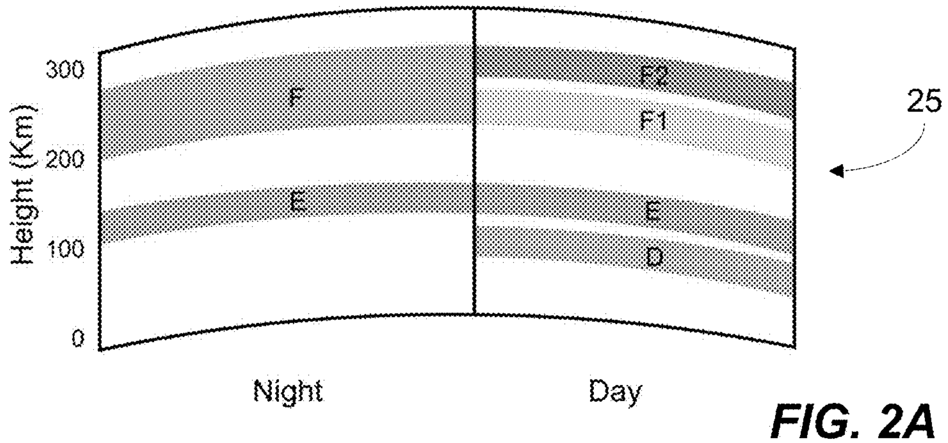
FIG. 2A is a diagram illustrating the relative height of the ionospheric layers in Earth atmosphere for night and day.
Figure 2B:
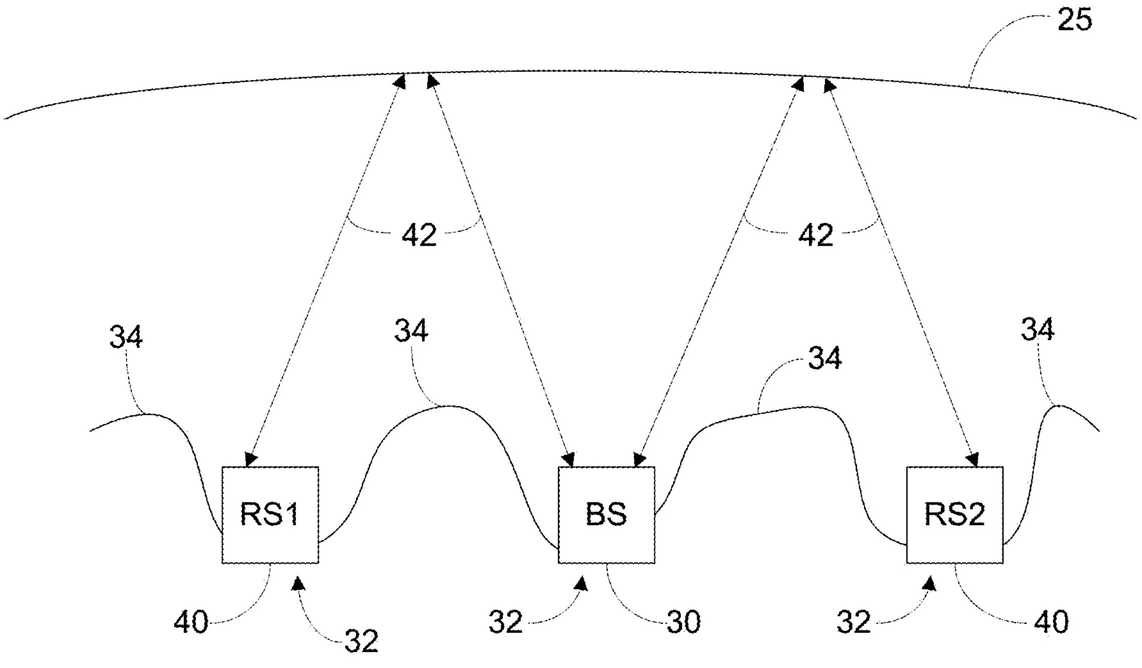
FIG. 2B is a diagram illustrating exemplary NVIS communications using the ionosphere to communicate without line of sight.
Figure 4A:
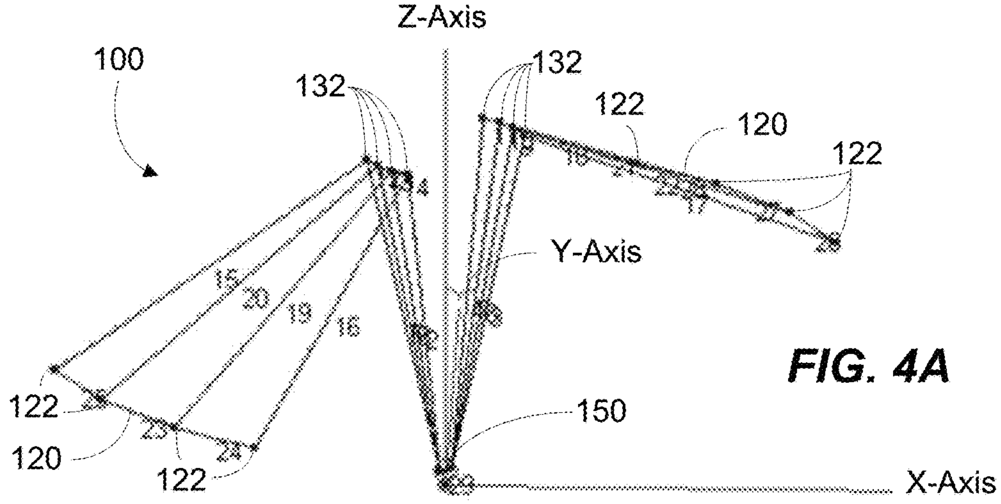
FIGS. 4A-4B are diagrams illustrating perspective and plan views, respectively, of an embodiment of a 4-wire with skirt and waist fan NVIS base station antenna, according to the present invention.
Figure 4B:
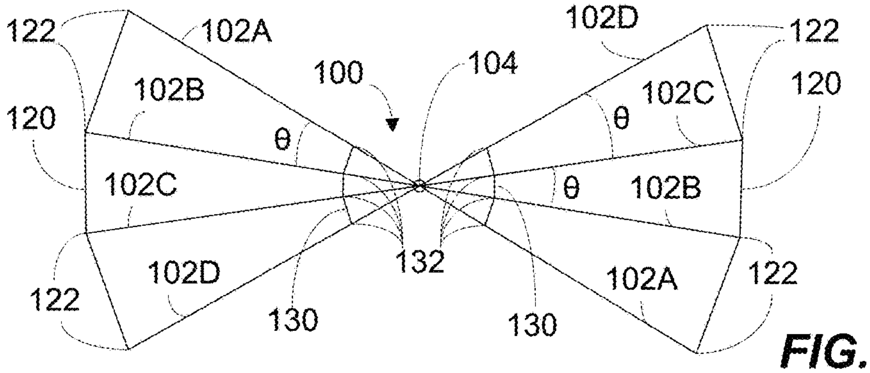
Figure 4C:
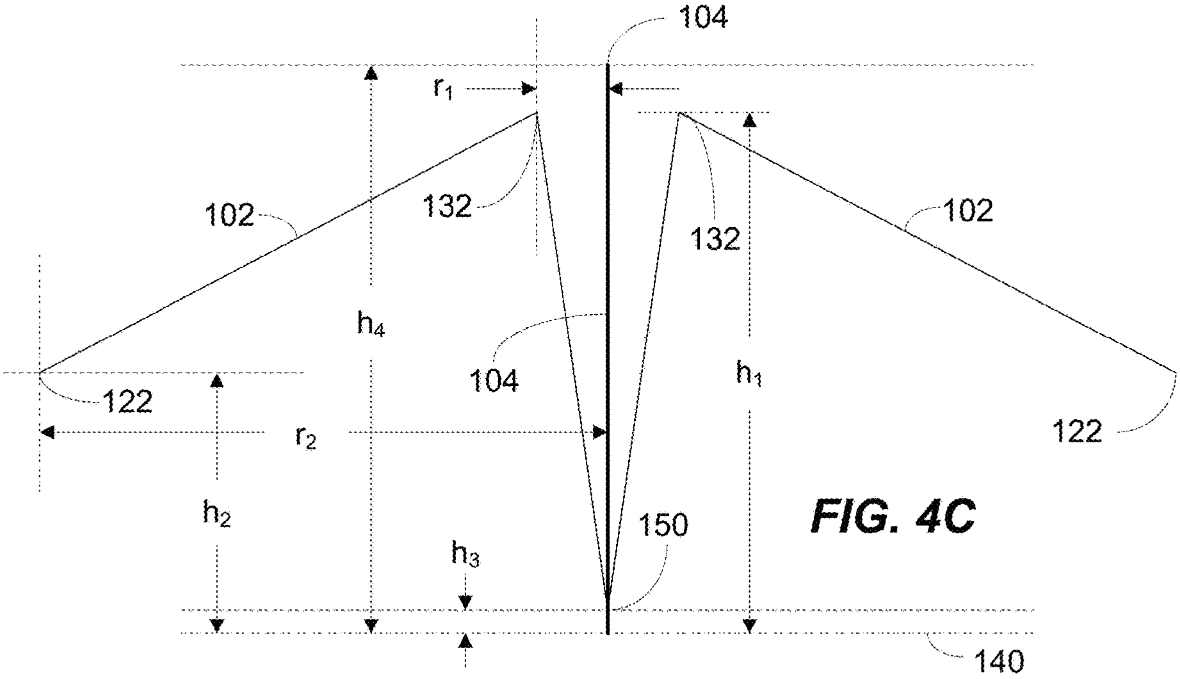
FIG. 4C is a diagram illustrating an elevation view of one dipole of the antenna shown in FIGS. 4A and 4B.

FIGS. 4A and 4B are diagrams illustrating perspective and plan views, respectively, of an embodiment of a 4-wire with skirt and waist fan NVIS base station antenna 100, according to the present invention. FIG. 4C is a diagram illustrating an elevation view of one dipole 102 (any one of the four dipole wires 102A-102D) of the base station antenna 100 shown in FIGS. 4A and 4B. It will be understood that the diagrams of base station antenna 100 shown in FIGS. 4A and 4B as well as dipole 102 shown in FIG. 4C are illustrative only and are not drawn to scale. Base station antenna 100 may be symmetrical about the Z-axis shown in FIG. 4A and the support mast 104 shown in FIGS. 4B and 4C.

More particularly with reference to FIG. 4A, it will be understood that a mast 104 (not shown but extending along the Z-axis) is used to support the 4-wire with skirt and waist fan NVIS base station antenna 100 via guy wires (not shown, but inherently extending between endpoints 122 and ground as well as from vertices 132 to the mast 104). FIGS. 4A and 4B best illustrate end point partial ring wire segments, collectively referred to as "skirt" 120 at lateral extremities of base station antenna 100. FIGS. 4A and 4C also best illustrates vertices 132 located at highest vertical portions of the dipole wires 102A-102D of base station antenna 100. FIG. 4B best illustrates vertex ring wire segments 130 connecting adjacent vertices 132 and collectively referred to as "waist" located along the highest vertical portions of the dipole wires 102A-102D of base station antenna 100. FIGS. 4A and 4C best illustrate feed point 150 located at the lowest vertical portion of antenna at the mast 104. The skirt 120 connects the endpoints 122 of the dipoles 102A-102D of base station antenna 100. The waist 130 connects the vertices of the dipoles 102A-102D of base station antenna 100. Feed point 150 is where a transceiver (not shown but see 20, FIGS. 1 and 64, FIG. 3) may be connected for broadcasting and receiving via base station antenna 100. The distance, $2r_1$, between waist segments 130 opposite each other across the Z-axis of the V-shaped feed structure is a critical design feature. Increasing that distance, $2r_1$, may increase antenna efficiency, but at the expense of Q-factor. The dipole wires 102A-102D extending from the vertices 132 out to end points 122 may be horizontal relative to ground 140 according to alternative embodiments of base station antenna 100 (not shown) and downward sloping as shown in FIGS. 4A and 4C according to other embodiments. According to a particular embodiment of base station antenna 100, the slope of dipole wires 102A-102D between endpoints 122 and vertices 130 may be approximately 0.5. Slope may also be selected to prevent dipole wires 102A-102D from approaching too close to the ground 140. However, it will be understood that this slope may range from approximately 0 to approximately 1 according to other embodiments of the present invention. It will be understood that the inventive antennas disclosed in the present invention are configured to work best on conventional field, farmland, or dirt ground surfaces.

As best illustrated in FIG. 4B, each of the 4 dipoles 102A-102D of base station antenna 100 cross each other at the feed point 150 of mast 104. As shown in FIG. 4B, the separation angle, θ, may be approximately identical between dipoles 102A-102D when viewed along the Z-axis from above. According to a particular embodiment of a base station 100 the separation angle, θ, may be approximately 13.3°. According to other embodiments, the separation angle, θ, may be in a range from about 10-16° and may not be identical between all dipoles. The skirt wire segments 120 connecting end points 122 are conducting and may reduce the antenna Q-factor. According to a particular embodiment and as best shown in FIG. 4A, the central skirt wire segments marked 23 and 27 may be selected slightly longer, e.g., approximately 3.1 m, than the outer skirt wire segments 24, 25, 26 and 28, e.g., approximately 2.9 m. The purpose of using skirt 120 and waist 130 is to eliminate a loop in the Smith chart associated with base station antenna 100.

As best illustrated in FIG. 4C the vertices 132 are separated by a radius, $r_1$, as measured from the mast 104, or Z-axis. According to a particular embodiment, radius, $r_1$, may be approximately 2.5 meters from the mast 104, or Z-axis. According to other embodiments of base station antenna 100, radius, $r_1$, may be in a range from about 2-3 m. The end points 122 of the dipole wires 102 are each located at a radius, $r_2$, from the mast 104, or Z-axis. According to a particular embodiment of base station antenna 100, radius, $r_2$, may be about 12.6 m from the mast 104, or Z-axis. According to various additional embodiments, radius, $r_2$, may range approximately 11-14 m. As shown in FIG. 4C, the distance measured from ground 140 to the vertices 132 (or waist 130) of base station antenna 100 is height, $h_1$. According to a particular embodiment, height, $h_1$, may be approximately 10.8 m. According to other embodiments of base station antenna 100, height, $h_1$, may range from about 10-12 m. As further shown in FIG. 4C the distance measured from ground 140 to end points 122 (or skirt 120) is height, $h_2$. According to a particular embodiment of base station antenna 100, height, $h_2$, may be approximately 5.7 m. According to other embodiments of base station antenna 100, height, $h_2$, may range from about 4-8 m. As further shown in FIG. 4C the distance measured from ground 140 to feed point 150 is height, $h_3$. According to a particular embodiment, the feed point wires of each dipole 102 connect to a segment of the mast 104 at a height, $h_3$, of approximately 0.5 m above ground 140. As feed point height, $h_3$, is near ground 140 level, it is particularly useful for access by a user or radio control operator standing on the ground 140. According to other embodiments of base station antenna 100, height, $h_3$, may range from about 0.3-0.7 m. The mast height, $h_4$, may be approximately 12 m for embodiments of base station antenna 100.

The 10 W transmitter of a conventional radio set 64 (FIG. 3) does not require a 50Ω antenna. Such conventional 10 W transmitters can automatically tune to the antenna used for transmission. Accordingly, there is no need for resistors (see, e.g., 60 in FIG. 3) in the embodiments of the present base station antenna 100. Table 1, below, details the remote transmitter performance improvement over a conventional antenna 50 (FIG. 3) for the embodiment of a 4-wire with skirt and waist fan NVIS base station antenna 100, according to the present invention. Note that the conventional fan NVIS antenna 50 data presented in Table 1 is for a 15 m mast height. This 15 m mast height is in contrast to the 12 m mast height, $h_4$, of the embodiment of a fan NVIS base station antenna 100 of the present invention. Note that the use of a 12 m mast in the conventional antenna 50 would likely reduce the efficiency and isotropic antenna pattern gain for a conventional antenna 50. Note further that Table 1 data includes the following ground parameters: relative permittivity, $\varepsilon_r$=10 and ground conductivity, σ=0.01 S/m where S is measure in units of Siemens.

TABLE 1

Performance Comparison for Conventional 50 and Inventive 100 Antennas

| | Conventional Antenna 50 | 4 Wire with Skirt and Waist Fan NVIS Base Station Antenna 100 | | |
|---|---|---|---|---|
| Frequency MHz | Typical Gain 90°-60° ± 1 dB (15 m Mast) dBi with tolerance | Gain at 90° & Typical (12 m Mast) dBi with tolerance | Efficiency dB | Typical Effective increase in Remote TX Power |
| 2 | −2.5 ± 1 | −0.01/−0.95 ± 1.02 | −8.00 | 14 |
| 3 | −2.0 ± 1 | 3.65/2.62 ± 1.02 | −4.38 | 29 |
| 4 | −1.0 ± 1 | 5.40/4.35 ± 1.05 | −2.58 | 34 |
| 6 | 0 ± 1 | 6.55/5.42 ± 1.13 | −1.18 | 35 |
| 8 | 2.0 ± 1 | 6.40/5.085 ± 1.315 | −0.98 | 20 |
| 10 | 2.5 | 5.57/3.98 ± 2.07 | −1.27 | 14 |
| 11 | No data | 4.93/3.835 ± 1.925 | −1.65 | No Data |

The 4-wire with skirt and waist fan NVIS base station antenna 100 includes one 12 m mast 104, the 4 dipole antenna wires 102A-102D, and support guy wires (not shown, but inherent to the structure of the present invention. The guy wires (again, not shown for simplicity) may be oriented at approximately 26.6° relative to the ground 140 according to a particular embodiment of the present invention. According to one embodiment of base station antenna 100, the footprint of the antenna elements may cover a generally rectangular area of approximately 48 m×17.5 m. According to one embodiment, base station antenna 100 may have a first resonance at approximately 2.982 MHz with a farmland ground relative permittivity, $\varepsilon_r$, of approximately 17 and ground conductivity, σ, of approximately 20 mS. The end points 122 of the 4 dipole wires 102A-102D are connected with horizontal wires forming skirt 120. The highest points, or vertices 132, of the 4 dipole wires 102A-102D are also connected with horizontal wires forming waist 130. These wires eliminate a loop in the Smith chart and spikes in the antenna Q-factor. The skirt 120 and waist 130 features of base station antenna 100 insure accurate tuning at all operational frequencies. Using 4-wires on a dipole arm also reduces the magnitude of the impedance and Q-factor above 6 MHz.

3-Wire NVIS Base Station Antenna Design

Figure 5A:
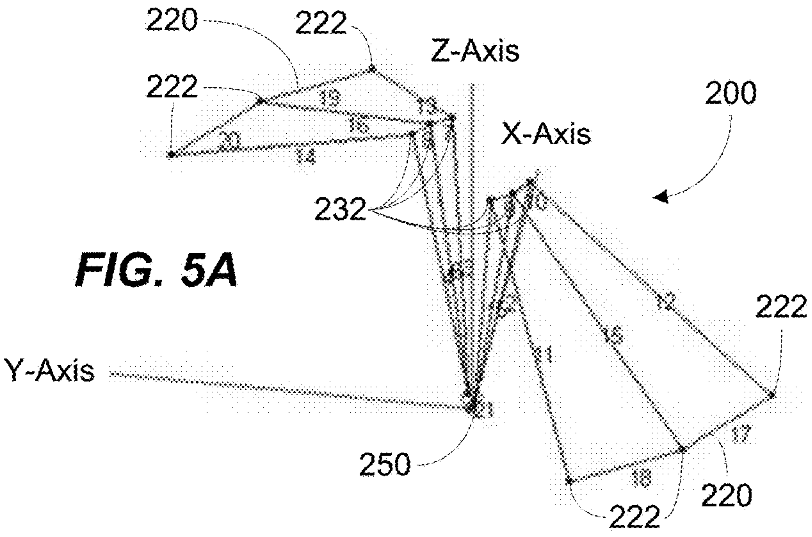
FIGS. 5A and 5B are diagrams illustrating perspective and plan views, respectively, of an embodiment of a 3-wire with skirt and waist fan NVIS base station antenna, according to the present invention.
Figure 5B:
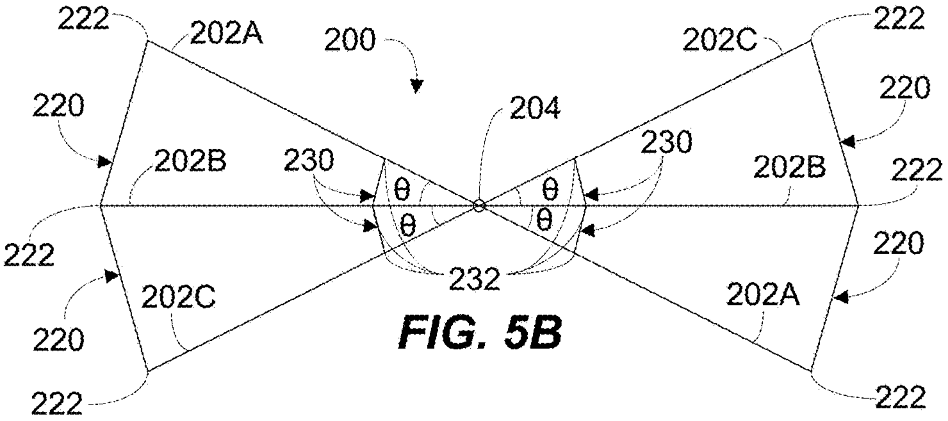
Figure 5C:
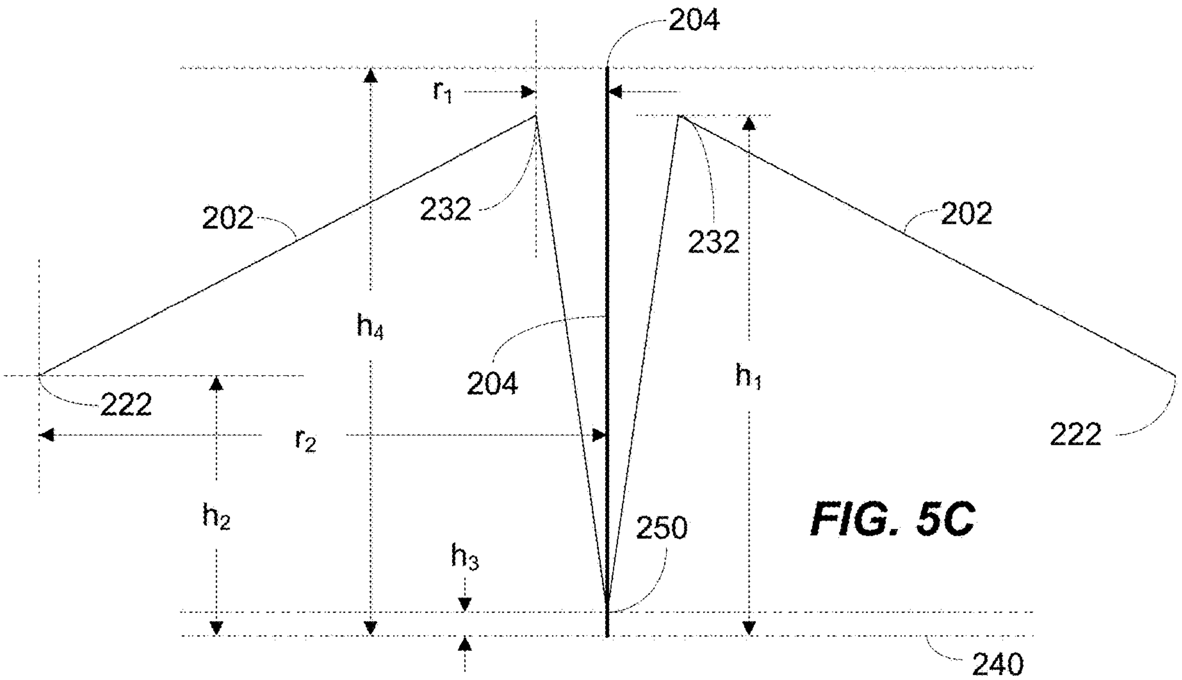
FIG. 5C is a diagram illustrating an elevation view of one dipole of the antenna shown in FIGS. 5A and 5B.

FIGS. 5A and 5B are diagrams illustrating perspective plan and elevation views, respectively, of an embodiment of a 3-wire with skirt and waist fan NVIS base station antenna 200, according to the present invention. FIG. 5C is a diagram illustrating an elevation view of one dipole 202 (any one of the three dipole wires 202A-202C) of the base station antenna 200 shown in FIGS. 5A and 5B. It will be understood that the diagrams of base station antenna 200 shown in FIGS. 5A and 5B as well as the dipole 202 shown in FIG. 5C are illustrative only and are not drawn to scale. Base station antenna 200 may be symmetrical about the Z-axis shown in FIG. 5A and the support mast 204 shown in FIGS. 5B and 5C.

More particularly with reference to FIG. 5A, it will be understood that a mast 204 (not shown but extending along the Z-axis) is used to support the 3-wire with skirt and waist fan NVIS base station antenna 200 via guy wires (not shown, but inherent as described above for antenna 100). FIGS. 5A and 5B best illustrate end point partial ring wire segments, collectively referred to as "skirt" 220 at lateral extremities. FIGS. 5A and 5B also best illustrates partial ring wire segments collectively referred to as "waist" 230 connecting adjacent vertices 232 located at highest vertical portions of the dipoles 202A-202C of base station antenna 200. FIGS. 4A and 4C best illustrate feed point 240 located at the lowest vertical portion of base station antenna 200 at the mast 204. The skirt 220 connects the endpoints 222 of the dipoles 202A-202C of base station antenna 200. The waist 230 connects the vertices 232 of the dipoles 202A-202C of base station antenna 200. Feed point 240 is where a transceiver (not shown but see 20, FIGS. 1 and 64, FIG. 3) may be connected for broadcasting and receiving via base station antenna 200.

As best illustrated in FIG. 5B, each of the 3 dipoles 202A-202C of base station antenna 200 cross each other at the feed point 250 of mast 204. As shown in FIG. 5B, the separation angle, θ, may be approximately identical between dipoles 202A-202C when viewed along the Z-axis from above. According to a particular embodiment of a base station antenna 200 the separation angle, θ, may be approximately 20°. According to other embodiments, the separation angle may be in a range from approximately 15-25° and may not be identical between all dipoles.

As best illustrated in FIG. 5C the vertices 232, (or waist 230), may be separated by a radius, $r_1$, as measured from the mast 204, or Z-axis. According to a particular embodiment, radius, $r_1$, may be approximately 2.5 m from the mast 204, or Z-axis. According to other embodiments of base station antenna 200, radius, $r_1$, may be in a range from about 2-3 m. The end points 222 of the dipole wires 202A-202C are each located at a radius, $r_2$, from the mast 204 or Z-axis. According to a particular embodiment of base station antenna 200, radius, $r_2$, may be about 12.6 m from the mast 204, or Z-axis. According to various additional embodiments, radius, $r_2$, may range approximately 11-14 m. As shown in FIG. 50, the distance measured from ground 240 to the vertices 232 (or waist 230) of base station antenna 200 is height, $h_1$. According to a particular embodiment, height, $h_1$, is approximately 10.8 m. According to other embodiments of base station antenna 200, height, $h_1$, may range from about 10-12 m. As further shown in FIG. 5C the distance measured from ground 240 to end points 222 is height, $h_2$. According to a particular embodiment of base station antenna 200 height, $h_2$, may be approximately 5.7 m. According to other embodiments of base station antenna 200, height, $h_2$, may range from approximately 4-8 m. As further shown in FIG. 5C, the distance measured from ground 240 to feed point 250 is height, $h_3$. According to a particular embodiment, the feed point wires connect to a segment of the mast at a height, $h_3$, of approximately 0.5 m above ground 240, which is particularly useful for access by a user or radio control operator standing on the ground 240. According to other embodiments of base station antenna 200, height, $h_3$, may range from about 0.3-0.7 m. The mast height, $h_4$, may be approximately 12 m for embodiments of base station antenna 200. The dipole wires 202A-202C extending from the vertices 232 out to end points 222 may be horizontal in elevation according to some embodiments of base station antenna 200 and downward sloping as shown in FIGS. 5A and 5C according to other embodiments. According to a particular embodiment of base station antenna 200, the slope of the dipole wires 202A-202C between endpoints 222 and vertices 232 may also be approximately 0.5. However, it will be understood that this slope may range from approximately 0 to approximately 1 according to other embodiments of the present invention.

Figure 6A:
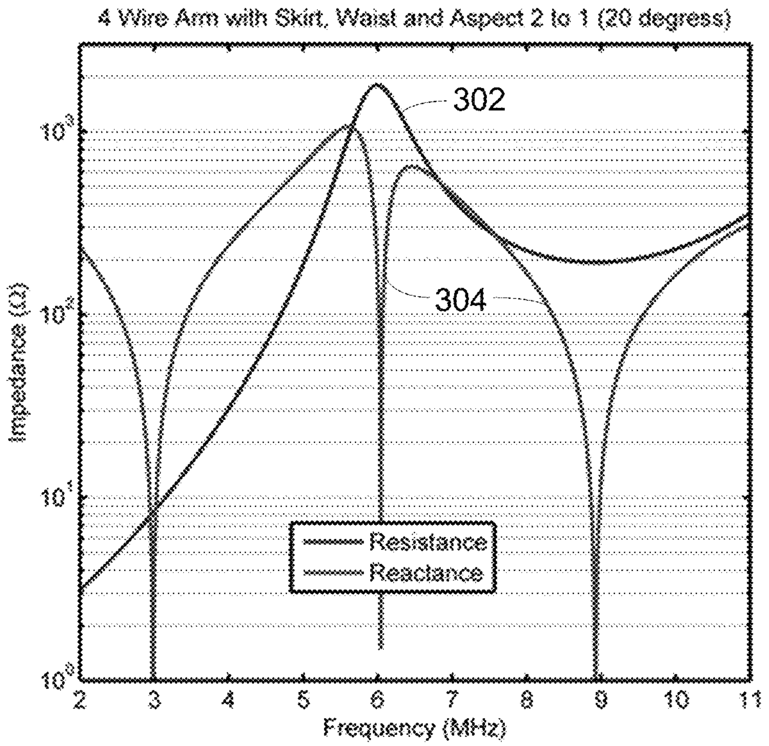
FIGS. 6A and 6B are graphs illustrating impedance as a function of frequency for a 4-wire embodiment and a 3-wire embodiment, respectively, of the skirt and waist fan NVIS base station antennas, according to the present invention.
Figure 6B:
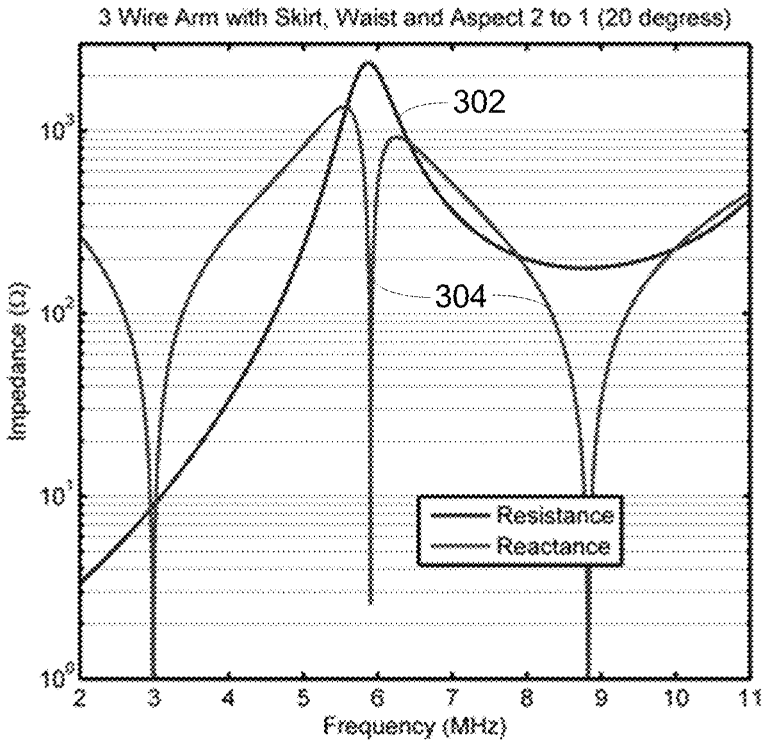

FIGS. 6A and 6B are graphs illustrating impedance as a function of frequency for the 4-wire embodiment 100 and 3-wire embodiment 200, respectively, of the skirt and waist fan NVIS base station antennas disclosed herein, according to the present invention. In both original color graphs, resistance 302 is shown in blue, and reactance 304 is shown in green.

2-Wire NVIS Remote Station Antenna Design

Figure 8A:
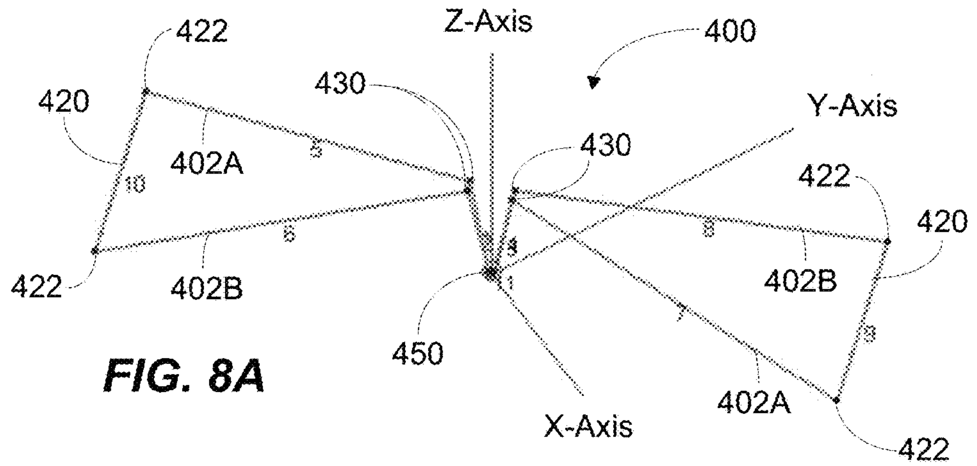
FIGS. 8A and 8B are diagrams illustrating perspective and plan views, respectively, of an embodiment of a 2-wire with skirt fan NVIS remote station antenna, according to the present invention.
Figure 8B:
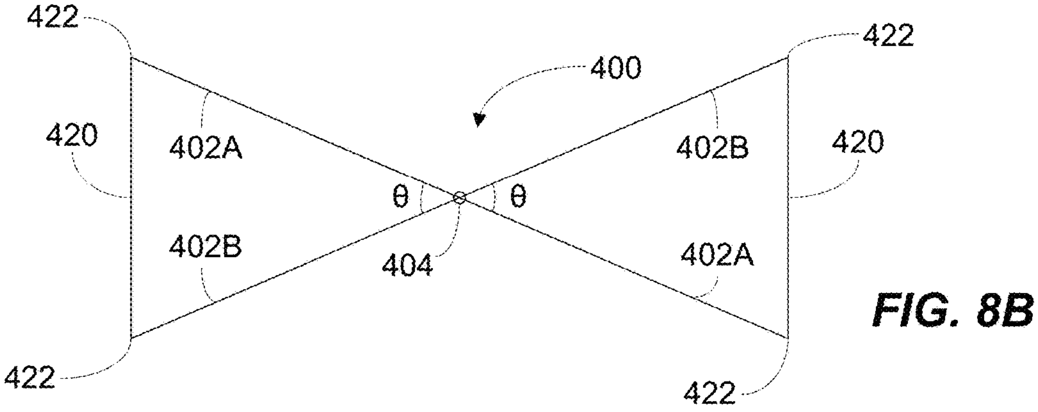
Figure 8C:
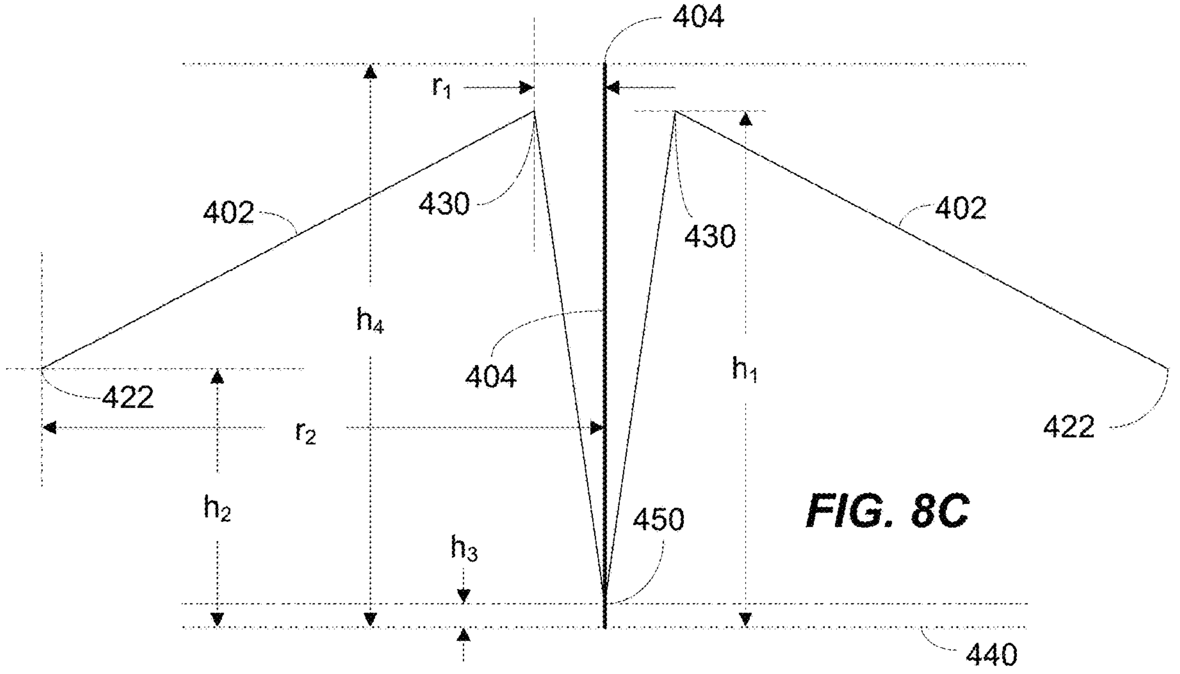
FIG. 8C is a diagram illustrating an elevation view of one dipole of the remote station antenna shown in FIGS. 8A and 8B.

FIGS. 8A and 8B are diagrams illustrating perspective and plan views, respectively, of an embodiment of a 2-wire with skirt fan NVIS remote station antenna 400, according to the present invention. Unlike in the base station antenna embodiments 100 and 200, embodiments of the remote station antenna 400 do not include waist wire segments connecting adjacent vertices 430. FIG. 8C is a diagram illustrating an elevation view of one dipole 402 (either dipole wire 402A-402B) of the remote station antenna 400 shown in FIGS. 8A and 8B. It will be understood that the diagrams of remote station antenna 400 shown in FIGS. 8A and 8B as well as the dipole 402 shown in FIG. 8C are illustrative only and are not drawn to scale. Remote station antenna 400 may be symmetrical about the Z-axis shown in FIG. 8A and the mast 404 shown in FIGS. 8B and 8C.

More particularly with reference to FIG. 8A, it will be understood that a mast 404 (not shown but extending along the Z-axis) is used to support the 2-wire with skirt fan NVIS remote station antenna 400 via guy wires (not shown, but inherent as described above for the embodiments of antennas 100 and 200). FIGS. 8A and 8B best illustrate end point skirt wire segments, collectively referred to as "skirt" 420 at lateral extremities. FIGS. 8A and 8B also best illustrates vertices 430 located at highest vertical portions of the dipoles 402A-402B of remote station antenna 400. FIGS. 8A and 8C best illustrate feed point 450 located at the lowest vertical portion of remote station antenna 400 at the mast 404. The skirt wire segments 420 connect the endpoints 422 of the dipoles 402A-402B of remote station antenna 400. Feed point 450 is where a transceiver (not shown but see 20, FIGS. 1 and 64, FIG. 3) may be connected for broadcasting and receiving via remote station antenna 400.

As best illustrated in FIG. 8B, each of the 2 dipole wires 402A-402B of remote station antenna 400 cross each other at the feed point 450 of mast 404. As shown in FIG. 8B, the separation angle, θ, may be identical between dipoles 402A-402B when viewed along the Z-axis from above. According to a particular embodiment of remote station 400, the separation angle, θ, may be approximately 30°. According to other embodiments, the separation angle, θ, may be in a range from approximately 20-40°. According to one embodiment of remote station antenna 400, each skirt wire segment 420 may be approximately 21.4 ft in length. According to other embodiments of remote station antenna 400, each skirt wire segment 420 may fall within a range of approximately 19-24 ft in length.

As best illustrated in FIG. 8C, the vertices 430, may be separated by a radius, $r_1$, as measured from the mast 404 or Z-axis. According to a particular embodiment, radius, $r_1$, may be approximately 2.5 ft from the mast 404, or Z-axis. According to other embodiments of remote station antenna 400, radius, $r_1$, may be in a range from about 2-3 ft. The end points 422 of the dipole wires 402A and 402B are each located at a radius, $r_2$, from the mast 404, or Z-axis. According to a particular embodiment of remote station antenna 400, radius, $r_2$, may be about 41.3 ft from the mast 404, or Z-axis. According to other embodiments of remote station antenna 400, radius, $r_2$, may range approximately 36-46 ft. As shown in FIG. 8C, the distance measured from ground 440 to vertices 430 of remote station antenna 400 is height, $h_1$. According to a particular embodiment, height, $h_1$, may be approximately 14.4 ft. According to other embodiments of remote station antenna 400, height, $h_1$, may fall within the range of approximately 14-15 ft. As further shown in FIG. 8C the distance measured from ground 440 to end points 422 is height, $h_2$. According to a particular embodiment of remote station antenna 400 height, $h_2$, may be approximately 4.7 ft. According to other embodiments of remote station antenna 400, height, $h_2$, may fall within a range of approximately 5-7 ft. As further shown in FIG. 8C the distance measured from ground 440 to feed point 450 is height, $h_3$. According to a particular embodiment, the feed point wires are located at the mast 404 at a height, $h_3$, of about 0.5 ft above ground 440. Having a feed point 450 near ground 440 is particularly useful for access by a user or radio control operator standing on the ground 440. According to other embodiments of remote station antenna 400, height, $h_3$, may range from about 0.3-0.7 ft. The mast height, $h_4$, may be approximately 15 ft for embodiments of remote station antenna 400. However, it will be understood that according to other embodiments of remote antenna 400, mast height, $h_4$, may range from about 10 ft to about 20 ft. The dipole wires 402A and 402B extending from the vertices 430 out to end points 422 may be horizontal in elevation according to some embodiments of remote station antenna 400 and downward sloping as best shown FIG. 5C according to other embodiments. According to a particular embodiment of remote station antenna 400, the slope of the dipole wires 402A and 402B between end points 422 and vertices 430 may be approximately 0.23 for remote station antenna 400. However, it will be understood that this slope may range from approximately 0 to approximately 0.5 according to other embodiments of the present invention.

Table 2, below, provides comparative dimensions of the various embodiments 100, 200 and 400 of a fan NVIS antenna disclosed herein. Table 1 includes presently preferred nominal (Nom) and suitable ranges (Rng) as noted for the dimensional parameters of the antennas of the present invention.

TABLE 2

Comparative Dimensions of Fan NVIS Antenna Embodiments

| | $r_1$ | | $r_2$ | | $h_1$ | | $h_2$ | | $h_3$ | | $h_4$ | θ |
|---|---|---|---|---|---|---|---|---|---|---|---|---|
| Parameter | Nom | Rng | Nom | Rng | Nom | Rng | Nom | Rng | Nom | Rng | Nom | Nom |
| Base Station Antenna 100 | 2.5 m | 2-3 m | 12.6 m | 11-14 m | 10.8 m | 10-12 m | 5.7 m | 4-8 m | 0.5 m | 0.3-0.7 m | 12 m | 13.3° |
| Base Station Antenna 200 | 2.5 m | 2-3 m | 12.6 m | 11-14 m | 10.8 m | 10-12 m | 5.7 m | 4-8 m | 0.5 m | 0.3-0.7 m | 12 m | 20° |
| Remote Station Antenna 400 | 2.5 ft | 2-3 ft | 41.3 ft | 36-46 ft | 14.4 ft | 14-15 ft | 4.7 ft | 5-7 ft | 0.5 ft | 0.3-0.7 ft | 15 ft | 30° |

Figure 9:
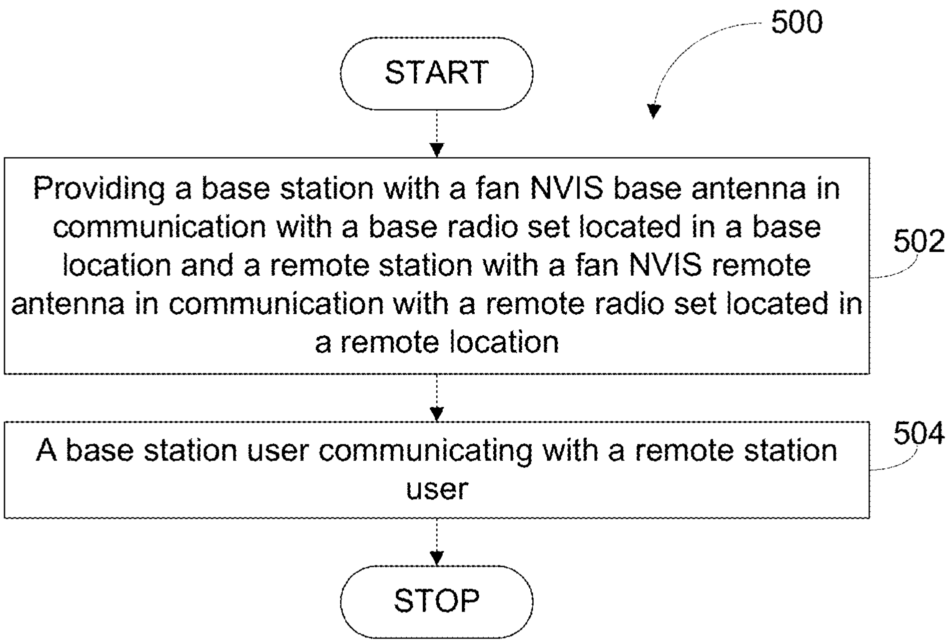
FIG. 9 is a flowchart of an exemplary method of communicating using NVIS communications, according to the present invention.

FIG. 9 is a flowchart of an exemplary method 500 of communicating using NVIS communications, according to the present invention. The exemplary method 500 may include providing 502 a base station with a fan NVIS base antenna in communication with a base radio set located in a base location and a remote station with a fan NVIS remote antenna in communication with a remote radio set located in a remote location. The exemplary method 500 may further include a base station user communicating with a remote station user.

According to a particular method of communicating 500, the base station antenna and the remote station antenna may each include a mast extending along a Z-axis and having height, $h_4$, measured from ground. According to this particular method of communicating 500, the base station antenna and the remote station antenna may each further include a plurality of dipoles crossing each other at a central feed point disposed at the mast, adjacent dipoles separated from each other by an angle, θ, when viewed along the Z-axis, the plurality of dipoles having a bowtie shape when viewed along the Z-axis, wherein each wing of the bowtie is symmetrical about the Z-axis. According to this particular method of communicating 500, the base station antenna and the remote station antenna may each further include the feed point located at a height, $h_3$, measured from ground. According to this particular method of communicating 500, the base station antenna and the remote station antenna may each further include each of the plurality of dipoles having end points located at a height, $h_2$, measured from ground. According to this particular method of communicating 500, the base station antenna and the remote station antenna may each further include each of the plurality of dipoles having two vertices, each of the two vertices located at a height, $h_1$, measured from ground, each of the vertices disposed at a location between one of the end points and the feed point. According to this particular method of communicating 500, the base station antenna and the remote station antenna may each further be defined by $h_4>h_1>h_2>h_3$.

According to another embodiment of the method of communicating 500, the plurality of dipoles for the base station antenna may be either three or four dipoles. According to yet another embodiment of the method of communicating 500, the plurality of dipoles for the remote station antenna may be two dipoles.

In view of the particular embodiments of fan NVIS antennas and communication systems described herein with reference to the drawings above, more general embodiments of fan NVIS antennas and systems according to the present invention are disclosed below.

A general embodiment of a fan NVIS antenna is disclosed. The general embodiment of a fan NVIS antenna may include a mast extending along a Z-axis and having height, $h_4$, measured from ground. The general embodiment of a NVIS antenna may further include a plurality of dipoles crossing each other at a central feed point disposed at the mast. The adjacent dipoles may further be separated from each other by an angle, $\theta$, when viewed along the Z-axis. The plurality of dipoles may have a bowtie shape when viewed along the Z-axis. Each wing of the bowtie may be symmetrical about the Z-axis. The general embodiment of a fan NVIS antenna may further include the feed point located at a height, $h_3$, measured from ground. The general embodiment of a fan NVIS antenna may further include each of the plurality of dipoles having end points located at a height, $h_2$, measured from ground. The general embodiment of a fan NVIS antenna may further include each of the plurality of dipoles having two vertices, each of the two vertices located at a height, $h_1$, measured from ground. Each of the vertices may further be disposed at a location between one of the end points and the feed point. The general embodiment of a fan NVIS antenna may further include $h_4>h_1>h_2>h_3$.

According to a more particular embodiment, the fan NVIS antenna may further include a skirt of wire segments connecting adjacent dipole end points. Each of the end points may further be located at a radius, $r_2$, measured perpendicular from the Z-axis of the mast. According to another particular embodiment, the fan NVIS antenna may further include a waist of wire segments connecting adjacent vertices of adjacent dipoles. Each of the vertices along the waist may further be disposed at a radius, $r_1$, measured perpendicular from the Z-axis of the mast.

According to one particular embodiment of a fan NVIS antenna, the plurality of dipoles may be four dipoles. According to still another embodiment, the fan NVIS antenna may be a base station antenna. According to this exemplary fan NVIS base station antenna, the mast height, $h_4$, may be about 12 m. However, it will be understood that according to other embodiments of base antenna 100, mast height, $h_4$, may range from about 9 m to about 15 m. According to this fan NVIS base station antenna, the vertex height, $h_1$, may be about 10.8 m for a presently preferred embodiment and range approximately 10-12 m according to other embodiments. According to this fan NVIS base station antenna, the dipole end point height, $h_2$, may be about 5.7 m for a presently preferred embodiment and range approximately 4-8 m according to other embodiments. According to this fan NVIS base station antenna, the feed point height, $h_3$, may be about 0.5 m for a presently preferred embodiment and range approximately 0.3-0.7 m according to other embodiments. According to this fan NVIS base station antenna, the dipole angle of separation, $\theta$, may be about 13.3° for a presently preferred embodiment.

According to another embodiment, the fan NVIS base station antenna may further include a skirt of wire segments connecting adjacent dipole end points. According to this embodiment, each of the end points along the skirt may be disposed at a radius, $r_2$, measured perpendicular from the Z-axis of the mast. According to a presently preferred embodiment, the radius, $r_2$, may be approximately 12.6 m. According to other embodiments, the radius, $r_2$, may range approximately 11-14 m.

According to yet another embodiment, the fan NVIS base station antenna may further include a waist of wire segments connecting adjacent vertices of adjacent dipoles. According to this embodiment, each of the vertices along the waist may be disposed at a radius, $r_1$, measured perpendicular from the Z-axis of the mast. According to a presently preferred embodiment, the radius, $r_1$, may be approximately 2.5 m. According to other embodiments, radius, $r_1$, may range from approximately 2-3 m.

According to another embodiment of a fan NVIS antenna, the plurality of dipoles may be three dipoles. According to a presently preferred embodiment, the NVIS antenna may be a fan NVIS base station antenna having mast height, $h_4$, of approximately 12 m. However, it will be understood that according to other embodiments of base antenna 100, mast height, $h_4$, may range from about 9 m to about 15 m. Further according to this presently preferred embodiment, the vertex height, $h_1$, may be approximately 10.8 m. According to other embodiments, the vertex height, $h_1$, may range approximately 10-12 m. Further according to this presently preferred embodiment, the dipole end point height, $h_2$, may be approximately 5.7 m. According to other embodiments, the dipole end point height, $h_2$, may range 4-8 m. Further according to this presently preferred embodiment, the feed point height, $h_3$, may be approximately 0.5 m. According to other embodiment, the feed point height, $h_3$, may range approximately 0.3-0.7 m. Further according to this presently preferred embodiment, the dipole angle of separation, $\theta$, may be approximately 20°.

According to another embodiment, the fan NVIS antenna may further include a skirt of wire segments connecting adjacent dipole end points. According to this embodiment, each of the end points along the skirt may be disposed at a radius, $r_2$, measured perpendicular from the Z-axis of the mast. According to a presently preferred embodiment, the radius, $r_2$, may be approximately 12.6 m. According to other embodiments, radius, $r_2$, may range from approximately 11-14 m.

According to another embodiment, the fan NVIS antenna may further include a waist of wire segments connecting adjacent vertices of adjacent dipoles. According to this embodiment, each of the vertices along the waist may be disposed at a radius, $r_1$, measured perpendicular from the Z-axis of the mast. According to a presently preferred embodiment, the radius, $r_1$, may be about 2.5 m. According to other embodiments, radius, $r_1$, may range from approximately 2-3 m.

According to one particular embodiment of the fan NVIS antenna, the plurality of dipoles may be two dipoles. According to a presently preferred embodiment, the fan NVIS antenna may be a remote station antenna mast height, $h_4$, of approximately 15 ft. According to this presently preferred embodiment of a remote station antenna, the vertex height, $h_1$, may be approximately 14.4 ft. According to other embodiments, the vertex height, $h_1$, may range approximately 14-15 ft. Further according to this presently preferred embodiment of a remote station antenna, the dipole end point height, $h_2$, may be approximately 4.7 ft. According to other embodiments, the dipole end point height, $h_2$, may range 5-7 ft. Further according to this presently preferred embodiment of a remote station antenna, the feed point height, $h_3$, may be approximately 0.5 ft. According to other embodiments, the feed point height, $h_3$, may range approximately 0.3-0.7 ft. Further according to this presently preferred embodiment of a remote station antenna, the dipole angle of separation, $\theta$, may be approximately 30°.

According to another embodiment, a fan NVIS remote station antenna may further include a wire segment skirt connecting adjacent dipole end points. According to this embodiment, each of the end points may be disposed at a radius, $r_2$, measured perpendicular from the Z-axis of the mast. According to a presently preferred embodiment, the radius, $r_2$, may be approximately 41.3 ft. According to other embodiments, radius, $r_2$, may range from approximately 36-46 ft.

According to still another embodiment of a fan NVIS remote station antenna, each of the vertices may be disposed at a radius, $r_1$, measured perpendicular from the Z-axis of the mast. According to a presently preferred embodiment, radius, $r_1$, may be approximately 2.5 ft. According to other embodiments, radius, $r_1$, may range approximately 2-3 ft.

An embodiment of a NVIS radio communication system is disclosed. The communication system embodiment may include a fan NVIS base station antenna in communication with a base radio set. The communication system embodiment may further include a fan NVIS remote station antenna in communication with a remote radio set. According to this embodiment, the base station antenna and the remote station antenna may each include a mast extending along a Z-axis and having height, $h_4$, measured from ground. Further according to this embodiment, the base station antenna and the remote station antenna may each further include a plurality of dipoles crossing each other at a central feed point disposed at the mast. Further according to this embodiment, adjacent dipoles may be separated from each other by an angle, θ, when viewed along the Z-axis. Further according to this embodiment, the plurality of dipoles may have a bowtie shape when viewed along the Z-axis, wherein each wing of the bowtie is symmetrical about the Z-axis. Further according to this embodiment, the base station antenna and the remote station antenna may each include the feed point located at a height, $h_3$, measured from ground. Further according to this embodiment, the base station antenna and the remote station antenna may each include each of the plurality of dipoles having end points located at a height, $h_2$, measured from ground. Further according to this embodiment, each of the plurality of dipoles may further include two vertices. Further according to this embodiment, each of the two vertices may be located at a height, $h_1$, measured from ground. Further according to this embodiment, each of the vertices may be disposed at a location between one of the end points and the feed point. Further according to this embodiment, $h_4>h_1>h_2>h_3$.

According to one embodiment of the NVIS radio communication system, the plurality of dipoles for the base station antenna may include either three or four dipoles. According to another embodiment of the NVIS radio communication system, the plurality of dipoles for the remote station antenna may be two dipoles.

In understanding the scope of the present invention, the term “configured” as used herein to describe a component, section or part of a device includes hardware and/or software that is constructed and/or programmed to carry out the desired function. In understanding the scope of the present invention, the term “comprising” and its derivatives, as used herein, are intended to be open ended terms that specify the presence of the stated features, elements, components, groups, integers, and/or steps, but do not exclude the presence of other unstated features, elements, components, groups, integers and/or steps. The foregoing also applies to words having similar meanings such as the terms, “including”, “having” and their derivatives. Finally, terms of degree such as “substantially”, “about” and “approximately” as used herein mean a reasonable amount of deviation of the modified term such that the end result is not significantly changed.

From the above description of the inventive fan NVIS antennas, communication systems and methods of use, it is manifest that various alternative structures may be used for implementing features of the present invention without departing from the scope of the claims. The described embodiments are to be considered in all respects as illustrative and not restrictive. It will further be understood that the present invention may suitably comprise, consist of, or consist essentially of the component parts, method steps and limitations disclosed herein. The method and/or apparatus disclosed herein may be practiced in the absence of any element that is not specifically claimed and/or disclosed herein.

While the foregoing advantages of the present invention are manifested in the detailed description and illustrated embodiments of the invention, a variety of changes can be made to the configuration, design, and construction of the invention to achieve those advantages. Hence, reference herein to specific details of the structure and function of the present invention is by way of example only and not by way of limitation.

What is claimed is:

1. A fan near vertical incident skywave (NVIS) antenna, the fan NVIS antenna comprising:

a mast extending along a Z-axis and having height, $h_4$, measured from ground;

a plurality of dipoles crossing each other at a central feed point disposed at the mast, adjacent dipoles separated from each other by an angle, θ, when viewed along the Z-axis, the plurality of dipoles having a bowtie shape when viewed along the Z-axis, wherein each wing of the bowtie is symmetrical about the Z-axis;

wherein the feed point is located at a height, $h_3$, measured from ground;

wherein each of the plurality of dipoles further includes end points located at a height, $h_2$, measured from ground;

wherein each of the plurality of dipoles further includes two vertices, each of the two vertices located at a height, $h_1$, measured from ground, each of the vertices disposed at a location between one of the end points and the feed point; and wherein $h_4>h_1>h_2>h_3$.

2. The fan NVIS antenna according to claim 1, further comprising a skirt of wire segments connecting adjacent dipole end points, each of the end points disposed at a radius, $r_2$, measured perpendicular from the Z-axis of the mast.

3. The fan NVIS antenna according to claim 1, further comprising a waist of wire segments connecting adjacent vertices of adjacent dipoles, each of the vertices along the waist disposed at a radius, $r_1$, measured perpendicular from the Z-axis of the mast.

4. The fan NVIS antenna according to claim 1, wherein the plurality of dipoles comprises four dipoles.

5. The fan NVIS antenna according to claim 4, further comprising a base station antenna, wherein:

the mast height, $h_4$, is about 12 m;

the vertex height, $h_1$, is about 10.8 m;

the dipole end point height, $h_2$, is about 5.7 m;

the feed point height, $h_3$, is about 0.5 m; and the dipole angle of separation, θ, is about 13.3°.

6. The fan NVIS base station antenna according to claim 5, further comprising a skirt of wire segments connecting adjacent dipole end points, each of the end points along the skirt disposed at a radius, $r_2$, measured perpendicular from the Z-axis of the mast, wherein the radius, $r_2$, is about 12.6 m.

7. The fan NVIS base station antenna according to claim 5, further comprising a waist of wire segments connecting adjacent vertices of adjacent dipoles, each of the vertices along the waist disposed at a radius, $r_1$, measured perpendicular from the Z-axis of the mast wherein the radius, $r_1$, is about 2.5 m.

8. The fan NVIS antenna according to claim 1, wherein the plurality of dipoles comprises three dipoles.

9. The fan NVIS antenna according to claim 8, further comprising a base station antenna, wherein:

the mast height, $h_4$, is about 12 m;

the vertex height, $h_1$, is about 10.8 m;

the dipole end point height, $h_2$, is about 5.7 m;

the feed point height, $h_3$, is about 0.5 m; and the dipole angle of separation, θ, is about 20°.

10. The fan NVIS base station antenna according to claim 9, further comprising a skirt of wire segments connecting adjacent dipole end points, each of the end points along the skirt disposed at a radius, $r_2$, measured perpendicular from the Z-axis of the mast, wherein the radius, $r_2$, is about 12.6 m.

11. The fan NVIS base station antenna according to claim 9, further comprising a waist of wire segments connecting adjacent vertices of adjacent dipoles, each of the vertices along the waist disposed at a radius, $r_1$, measured perpendicular from the Z-axis of the mast, wherein the radius, $r_1$, is about 2.5 m.

12. The fan NVIS antenna according to claim 1, wherein the plurality of dipoles comprises two dipoles.

13. The fan NVIS antenna according to claim 12, further comprising a remote station antenna, wherein:

the mast height, $h_4$, is about 15 ft;

the vertex height, $h_1$, is about 14.4 ft;

the dipole end point height, $h_2$, is about 4.7 ft;

the feed point height, $h_3$, is about 0.5 ft; and the dipole angle of separation, θ, is about 30°.

14. The fan NVIS remote station antenna according to claim 13, further comprising a wire segment skirt connecting adjacent dipole end points, each of the end points disposed at a radius, $r_2$, measured perpendicular from the Z-axis of the mast, wherein the radius, $r_2$, is about 41.3 ft.

15. The fan NVIS remote station antenna according to claim 13, wherein each of the vertices is disposed at a radius, $r_1$, measured perpendicular from the Z-axis of the mast, wherein radius, $r_1$, is about 2.5 ft.

16. A near vertical incident skywave (NVIS) radio communication system, comprising:

a fan NVIS base station antenna in communication with a base radio set;

a fan NVIS remote station antenna in communication with a remote radio set; and the base station antenna and the remote station antenna each comprising:

a mast extending along a Z-axis and having height, $h_4$, measured from ground;

a plurality of dipoles crossing each other at a central feed point disposed at the mast, adjacent dipoles separated from each other by an angle, θ, when viewed along the Z-axis, the plurality of dipoles having a bowtie shape when viewed along the Z-axis, wherein each wing of the bowtie is symmetrical about the Z-axis;

wherein the feed point is located at a height, $h_3$, measured from ground;

wherein each of the plurality of dipoles further includes end points located at a height, $h_2$, measured from ground;

wherein each of the plurality of dipoles further includes two vertices, each of the two vertices located at a height, $h_1$, measured from ground, each of the vertices disposed at a location between one of the end points and the feed point; and wherein $h_4>h_1>h_2>h_3$.

17. The NVIS radio communication system according to claim 16, where the plurality of dipoles for the base station antenna comprises either three or four dipoles.

18. The NVIS radio communication system according to claim 16, where the plurality of dipoles for the remote station antenna comprises two dipoles.

19. A method of communicating using near vertical incident skywave (NVIS) radio communications, the method comprising:

providing a base station with a fan NVIS base antenna in communication with a base radio set located in a base location and a remote station with a fan NVIS remote antenna in communication with a remote radio set located in a remote location, the base station antenna and the remote station antenna each further comprising:

a mast extending along a Z-axis and having height, $h_4$, measured from ground;

a plurality of dipoles crossing each other at a central feed point disposed at the mast, adjacent dipoles separated from each other by an angle, θ, when viewed along the Z-axis, the plurality of dipoles having a bowtie shape when viewed along the Z-axis, wherein each wing of the bowtie is symmetrical about the Z-axis;

wherein the feed point is located at a height, $h_3$, measured from ground;

wherein each of the plurality of dipoles further includes end points located at a height, $h_2$, measured from ground;

wherein each of the plurality of dipoles further includes two vertices, each of the two vertices located at a height, $h_1$, measured from ground, each of the vertices disposed at a location between one of the end points and the feed point; and wherein $h_4>h_1>h_2>h_3$; and a base station user communicating with a remote station user.

20. The method of communicating according to claim 19, wherein the plurality of dipoles for the base station antenna comprises either three or four dipoles.

21. The method of communicating according to claim 19, wherein the plurality of dipoles for the remote station antenna comprises two dipoles.

* * * * *